United States Patent
Park et al.

(10) Patent No.: US 12,048,901 B2
(45) Date of Patent: Jul. 30, 2024

(54) METHOD FOR THE FABRICATION OF A PORE COMPRISING METALLIC MEMBRANE AND A PORE COMPRISING MEMBRANE

(71) Applicant: ETH ZURICH, Zurich (CH)

(72) Inventors: Hyung Gyu Park, Pohang (KR); Roman Wyss, Zurich (CH)

(73) Assignee: ETH ZURICH, Zurich (CH)

( * ) Notice: Subject to any disclaimer, the term of this patent is extended or adjusted under 35 U.S.C. 154(b) by 433 days.

(21) Appl. No.: 17/294,748

(22) PCT Filed: Nov. 14, 2019

(86) PCT No.: PCT/EP2019/081325
§ 371 (c)(1),
(2) Date: May 18, 2021

(87) PCT Pub. No.: WO2020/104287
PCT Pub. Date: May 28, 2020

(65) Prior Publication Data
US 2022/0008870 A1      Jan. 13, 2022

(30) Foreign Application Priority Data
Nov. 19, 2018 (EP) .................................... 18207023

(51) Int. Cl.
*B01D 69/12* (2006.01)
*B01D 67/00* (2006.01)
(Continued)

(52) U.S. Cl.
CPC ......... *B01D 69/12* (2013.01); *B01D 67/0072* (2013.01); *B01D 69/02* (2013.01);
(Continued)

(58) Field of Classification Search
CPC .... B01D 69/12; B01D 67/0072; B01D 69/02; B01D 69/10; B01D 71/022;
(Continued)

(56) References Cited

U.S. PATENT DOCUMENTS

| 8,623,121 B2 | 1/2014 | Way et al. |
| 2010/0055795 A1 | 3/2010 | Lee |

(Continued)

FOREIGN PATENT DOCUMENTS

| CN | 103043600 | 4/2013 |
| CN | 105734606 | 7/2016 |

OTHER PUBLICATIONS

Machine-generated English translation of CN 105734606, generated on Sep. 25, 2023.*

(Continued)

*Primary Examiner* — Fred Prince
(74) *Attorney, Agent, or Firm* — JMB Davis Ben-David

(57) ABSTRACT

The invention relates to a method for a fabrication of a pore comprising membrane and a pore comprising membrane. The pore comprising membrane (1) comprises at least a porous metallic layer (3) on a porous substrate (6), wherein the porous metallic layer (3) is connected to the porous substrate (6) and the pores (4) of the metallic layer (3) overlap at least partially with the pores (7) of the porous substrate (6). The method comprises at least the following steps: i) deposition of the metallic layer (3) onto a support material (2), wherein the deposited metallic layer (3) forms a plurality of feedthroughs, in particular a percolation network on the support material (2), ii) removal of the support material (2), iii) connecting of the metallic layer (3) with the porous substrate (6) such that pores (4) of the metallic layer (3) overlap at least partially with the pores (7) of the porous substrate (6).

14 Claims, 4 Drawing Sheets

Figure 1:
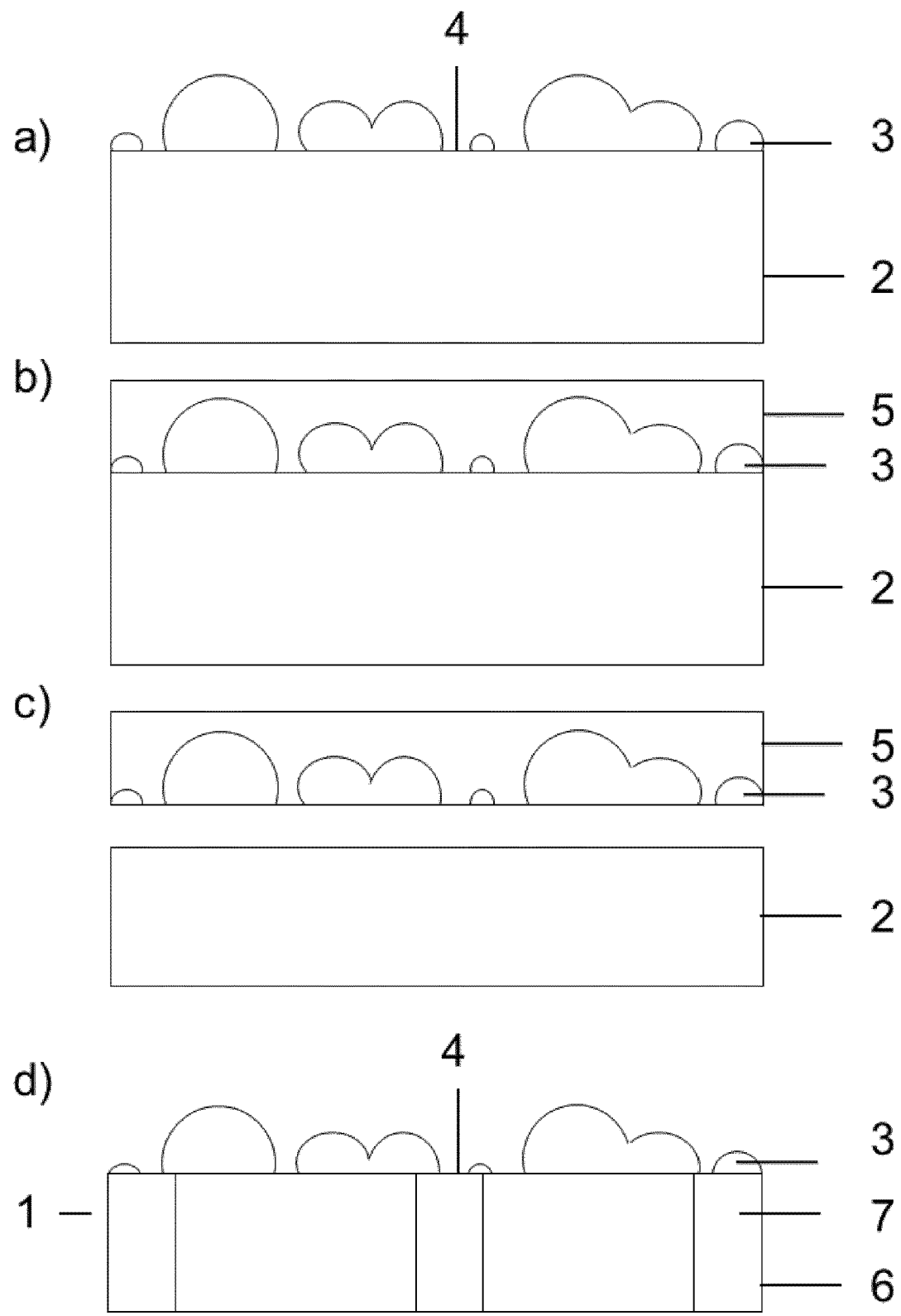

(51) Int. Cl.

| | |
|---|---|
| *B01D 69/02* | (2006.01) |
| *B01D 69/10* | (2006.01) |
| *B01D 71/02* | (2006.01) |
| *G01N 27/40* | (2006.01) |
| *G01N 27/41* | (2006.01) |
| *G01N 27/414* | (2006.01) |
| *H01M 4/66* | (2006.01) |
| *H01M 4/80* | (2006.01) |
| *H01M 8/02* | (2016.01) |
| *H01M 8/0232* | (2016.01) |

(52) U.S. Cl.
CPC .......... *B01D 69/10* (2013.01); *B01D 71/022* (2013.01); *G01N 27/40* (2013.01); *G01N 27/414* (2013.01); *H01M 4/661* (2013.01); *H01M 4/80* (2013.01); *H01M 8/0232* (2013.01); *B01D 2323/02* (2013.01); *B01D 2323/081* (2022.08); *B01D 2323/64* (2022.08); *B01D 2325/02* (2013.01); *B01D 2325/04* (2013.01); *Y02E 60/10* (2013.01); *Y02E 60/50* (2013.01)

(58) Field of Classification Search
CPC .......... B01D 2323/02; B01D 2323/081; B01D 2323/64; B01D 2325/02; B01D 2325/04; G01N 27/40; G01N 27/414; H01M 4/661; H01M 4/80; H01M 8/0232; Y02E 60/10; Y02E 60/50
USPC ........................................ 210/500.25, 500.27
See application file for complete search history.

(56) References Cited

U.S. PATENT DOCUMENTS

2013/0047855 A1* 2/2013 Polishchuk .......... B01D 69/105
  977/779
2018/0133659 A1* 5/2018 Bhave ................... B01D 71/40

OTHER PUBLICATIONS

Machine-generated English translation of CN 103043600, generated on Sep. 25, 2023.*
Ushakov et al "The influence of a thin gold film on the optical spectral characteristics of a porous anodic aluminum-oxide membrane." Tech. Phys. Lett. 43, 648-651 (2017). https://doi.org/10.1134/S1063785017070276.
Ding et al: "Nanoporous Gold Leaf: ""Ancient Technology""/ Advanced Material", Advanced Materials (2004) 16, No. 21, Nov. 4, 2004, pp. 1897-1900.
Striemer et al: "Charge- and Size-Based Separation of Macromolecules Using Ultrathin Silicon Membranes" Nature (2007), vol. 445, Feb. 15, 2007, pp. 749-753 doi:10.1038/nature05532.
Dekker: "Solid-State Nanopores", Nature Nanotechnology (2007), vol. 2, Apr. 2007, pp. 209-215.
Li et al.: "Hexagonal Pore Arrays with 50-420 nm Interpore Distance Formed by Self-Organization in Anodic Alumina", Journal of Applied Physics (1998), pp. 6023-6026 doi: 10.1063/1.368911.
Muluneh et al: "Track-Etched Magnectic Micropores for Immunomagnetic Isolation of Pathogens", Advanced Healthcare Materials (2014), vol. 3, pp. 1078-1085.
Udayabhaskararao et al: "Tunable Porous Nanoallotropes Prepared by Post Assembly Etching of Binary Nanoparticle Superlattices", Science (2017), vol. 358, Oct. 27, 2017, pp. 514-518.

* cited by examiner

METHOD FOR THE FABRICATION OF A PORE COMPRISING METALLIC MEMBRANE AND A PORE COMPRISING MEMBRANE

CROSS-REFERENCE TO RELATED APPLICATIONS

This is the U.S. National Stage of International Patent Application No. PCT/EP2019/081325 filed on Nov. 14, 2019, which in turn claims the benefit of European Patent Application No. 18207023.5 filed on Nov. 19, 2018.

Desirable in membrane technology is to manufacture stable, large-scale and ultrathin membranes. Ultrathin metallic membranes are considered as highly potent materials, as they could sustain high pressures, i.e. more than 2 bar, are conductive and can be functionalized easily, if demanded. With these properties, ultrathin porous metallic membranes would find their utility, amongst others, in filtration, sensing, as optical materials, or as grids for transmission electron microscopy. Manufacturing of such membranes from metal has however been regarded as challenging because a gold standard method of making porous thin-film metallic membranes is still missing.

Manufacturing of large scale porous thin film metallic membranes is generally cumbersome, as many processing steps, all requiring high precision, are needed. So far, large scale porous metallic membranes have been made by dealloying processes. However, membranes made by dealloying are rather thick (thickness above 100 nm). Another method of fabricating metallic membranes is conformal coating of a thick polymeric membrane with a metal. Also this process yields membranes that are rather thick. Moreover, the resulting membrane is not necessarily porous.

Non-metallic membranes, such as anodic alumina oxide membranes can be made on a large scale. These membranes are, however, brittle, not flexible and may not be made as thin film membranes.

Ultrathin porous metallic membranes would provide the possibility to study and observe new transport phenomena, open the pathway to applications that have been out of reach with current membrane technology and provide novel types of sensors that combine flow-through measurements with chemical analysis.

Based on the above mentioned state of the art, the objective of the present invention is to provide a simple method for the fabrication of a pore comprising membrane as well as the membrane itself. The objective is attained by claims 1 and 14 of the present invention. Embodiments of the method according to the invention are subject-matter of claims 2 to 13.

DETAILED DESCRIPTION OF THE INVENTION

The present invention relates to a method for a fabrication of a pore comprising membrane, comprising at least a porous metallic layer on a porous substrate, wherein
the porous metallic layer is connected to the porous substrate and
the pores of the metallic layer overlap at least partially with the pores of the porous substrate,
wherein the method comprises at least the following steps:
i) deposition of the metallic layer onto a support material, wherein the deposited metallic layer forms a plurality of feedthroughs, in particular a percolation network on the support material,
ii) removal of the support material,
iii) connecting of the metallic layer with the porous substrate, such that pores of the metallic layer overlap at least partially with the pores of the porous substrate.

The present invention relates further to a method for a fabrication of a foil or a thin film.

The metallic layer may comprise a metal or a metal alloy. The porous metallic layer is physically and/or chemically connected to the porous substrate. The entity of porous substrate and metallic layer is a membrane.

One advantage of this method compared to existing processes is its simplicity. The manufacturing process only consists of very few materials and equipment required. Further, this process is easy to scale up and is only limited by the size of the equipment.

The manufacturing of the membrane is carried out in a multi-step process comprising deposition of the metallic layer onto a support material and transfer of the metallic layer to a porous substrate. The metallic layer deposited on the support material may have a nominal thickness of 1 nm-200 nm, particularly 5 nm-100 nm, particularly a nominal thickness of 5 nm-50 nm. The deposition of the metallic layer results in a porous percolated film of the metallic layer on the support material. The porous, percolated structure of the metal on the support material is a result of differing surface energies of the two materials as well as atomic aggregation phenomena. This causes a dewetting of the metal from the support material. The pore sizes and the porosity of the metallic layer may be tailored by the metallic film thickness. The thicker the film is, the smaller the pores and the lower the final porosity.

The surface of the support material that is in contact with the metallic layer comprises materials that strongly differ in their surface energy from the surface energy of the metallic layer, resulting in a dewetting process between the metallic layer and the support material during the deposition of the metallic layer onto the surface of the support material. The support material may be non-porous.

The surface of the support material that is contacted with the metallic layer comprises ceramics, oxides, in particular metal oxides or metalloid oxides; or polymers, even more particularly the support material comprises silicon dioxide, silicon nitride, aluminum oxide, titanium oxide, polycarbonate, polymethylmethacrylate, polystyrene, polyimide, polyamide. The support material may comprise different layers of different materials. The layer of the support material that is in contact with the metallic layer has to be of sufficient thickness to prevent penetration of the metallic layer into the subjacent layers of the support material. The layer of the support material that is in contact with the metallic layer may be at least 10 nm in thickness, especially at least 30 nm in thickness, particularly 30 nm to 1 μm, particularly 30 nm to 500 nm, particularly 30 nm to 200 nm.

After deposition of the porous metallic layer onto the support material, the porous metallic layer is transferred to a porous substrate.

The pores of the metallic layer overlap at least partially with the pores of the porous substrate. As such, the properties related to the pore size and the porosity are characterized by the metallic layer and/or by the pores of the porous substrate. Further, the metallic layer may be free-standing above the pores of the porous substrate.

The process of transferring the metallic layer to the substrate comprises the steps of:
i) prior to removal of the support material, covering the metallic layer with a protection material, in that a multilayer composition forms with the metallic layer confined between the support material and the protection material, ii) removal of the support material, resulting in the metallic layer being deposited on the protection material, iii) removal of the protection material.

The protection material comprises any material, which is compatible with the metallic layer and the subsequent lift off procedure of the support material. Compatibility of the protection material relates to chemical compatibility, that is, the protection material does neither undergo chemical reaction with the metal layer nor during the process of removing the support material. Further, the protection material comprises a material, which provides stability to the metallic layer during and after the removal of the support material. The protection material may comprise polymers or photoresists, particularly gels, resins, polyether ketones, polyimides, polyolefins, polysulfones, polyamides, vinyl polymers, polyesters, polysiloxanes, polycarbonates, polyurethanes or copolymers or crosslinked polymers thereof, even more particularly, the protection material may comprise poly (methyl methacrylate) (PMMA), or polystyrene (PS).

The metallic layer is confined between the protection material and the support material. Hence a material comprising at least three layers is formed: Support material, metallic layer and protection material. After deposition of the protection material onto the metallic layer, the support material is removed from the metallic layer, resulting in the metallic layer being deposited on the protection material.

The deposition of the protection material onto the metallic layer may comprise any method that does neither chemically nor physically alter the metallic layer. The metallic layer remains inert under the conditions applied to deposit the protection material onto the metallic layer. The protection material may be deposited onto the metallic layer in solid form by contacting the protection material with the metallic layer.

The protection material may also be deposited on the metallic layer in liquid or partially liquid form. Liquid form refers to a dissolved, molten or viscous state of the protection material. Partially liquid refers to a state of the protection material, where only the surface of the protection material that is contacted with the metallic layer is in a dissolved, molten or viscous state. After deposition, the protection material is converted into solidified form by removal of the solvent or cooling of the material.

In particular, the protection material is spin coated onto the metallic layer.

The thickness of the protection material on the metallic layer is at least 20 nm, particularly 20 nm-500 µm, particularly 20 nm-100 µm, in particular embodiments 50 nm-1000 nm.

Prior to removal of the support material from the composition comprising support material and metallic layer, the method for the fabrication of a pore comprising membrane further comprises the step of covering the metallic layer by the porous substrate, resulting in a composite of these layers. A material of at least three layers is formed: support material, metallic layer, porous substrate. The metallic layer is covered by the porous substrate in that the pores of the porous substrate and the pores of the metallic layer overlap at least partially.

The porous substrate or a precursor thereof is deposited onto the metallic layer by contacting of the porous substrate or its precursor with the metallic layer. The porous substrate adheres to the metallic layer by physical or chemical means, particularly by physical means.

In another embodiment, the porous substrate or its precursor is at least partially molten or at least partially viscous when contacted with the metallic layer.

The precursor of the porous substrate may chemically or physically react on the metallic layer to yield the porous substrate. In one exemplary embodiment, a polymeric solution is added onto the metallic layer and the pores may be formed by phase inversion processes.

The porous substrate may also be prepared from porous gels or resins formed on the surface of the metallic layer.

After deposition of the porous substrate or its precursor onto the metallic layer, the support material is removed from the metallic layer.

The method for the fabrication of the pore comprising membrane further comprises the deposition of the metallic layer on the porous substrate, comprising at least the steps of i) covering the metallic layer deposited on the protection material with the porous substrate, in that a multilayer composition forms with the metallic layer confined between the protection material and the porous substrate, ii) removal of the protection material yielding the metallic layer deposited on the porous substrate.

Prior to covering of the metallic layer deposited on the protection material with the porous substrate, the support material is removed from the metallic layer.

When the porous substrate is deposited onto the metallic layer, which is deposited on the protection material, a material with at least three layers comprising the protection material, the metallic layer and the porous substrate is formed. The porous substrate is deposited onto the metallic layer in that the pores of the porous substrate overlap at least partially with the pores of the metallic layer. Following, the protection material is removed from the metallic layer, yielding the metallic layer deposited on the porous substrate. The pores of the metallic layer are free-standing above the pores of the porous substrate.

The method for a fabrication of a pore comprising membrane further comprises that during the removal of the support material the conditions are applied such that the metallic layer as well as the protection material are at least temporally inert. In particular, the conditions are applied such that the metallic layer as well as the protection material are inert during the whole time of the removal of the support material.

The method for a fabrication of a pore comprising membrane further comprises that during the removal of the support material the conditions are applied such that the metallic layer as well as the porous substrate are at least temporally inert. In particular, the conditions are applied such that the metallic layer as well as the porous substrate are inert during the whole time of the removal of the support material.

Conditions within the context of the present invention comprise chemical and/or physical conditions. In particular, conditions comprise reaction conditions. In another particulate embodiment, conditions comprise mechanical conditions.

Particularly, the conditions of the removal of the support material comprise etching, in particular acid, base or plasma etching, or mechanical conditions. Even more particularly the conditions comprise etching by an acid. In another particular embodiment, the support material is removed under mechanical conditions, particularly by application of an external force, even more particularly be peeling the support material off the metallic layer.

In a particular embodiment, the support material is removed from the metallic layer by etching in a buffered hydrofluoric acid solution. The metallic layer on the support material is not immersed into the buffered hydrofluoric acid solution but the support material floats on the surface of the solution with the support material facing the buffered hydrofluoric acid solution and the metallic layer and the protection or support material facing away from the solution. In this way, the support material is etched and dissolved or at least partially dissolved by the acidic solution, whereas the metallic layer and the protection material or the porous substrate remain unreacted.

The method for a fabrication of a pore comprising membrane further comprises that during the removal of the protection material the conditions are applied such that the metallic layer as well as the porous substrate are at least temporally inert, in particular inert during the whole time of the removal of the protection material.

Conditions within the context of the present invention comprise chemical and/or physical conditions. In particular, conditions comprise reaction conditions. In another particulate embodiment, conditions comprise mechanical conditions.

The conditions of the removal of the protection material in particular comprise etching, particularly etching in an acidic or basic environment or in a plasma, in particular plasma etching. The plasma can be an oxygen containing plasma.

The metallic material of the metallic layer is gold, platinum, silver, tungsten, copper, tantalum, molybdenum, palladium, iron, titanium, rhodium or osmium or any alloy thereof, particularly gold or gold alloy.

The support material has a surface energy that is different from the surface energy of the metal, particularly the surface energy of the support material is lower than the surface energy of the material of the metallic layer such that a dewetting between the support material and the metal and/or metal alloy occurs. As such, a percolation network with feedthroughs is formed on the surface of the support material. Hence, the formation of the pores in the metallic layer is a consequence of the dewetting between the metallic layer and the support material during the deposition of the metallic layer onto the support material. Below a critical surface energy threshold, no percolation network is formed, as the whole surface of the support material is immediately wetted by the metallic layer.

The protection material may be a polymer or a photoresist, in particular a gel, resin, polyether ketone, polyimide, polyolefin, polysulfone, polyamide, vinyl polymer, polyester, polysiloxane, polycarbonate, polyurethane or copolymer or crosslinked polymer thereof. Particularly, the protection material is poly(methyl methacrylate) (PMMA), or polystyrene (PS).

The material of the porous substrate may be ceramic, polymer, oxide, metal or a mixture thereof, in particular the material of the porous substrate is a polymer, a ceramic or a mixture thereof, even more particularly the material of the porous substrate is polycarbonate, even more particularly polycarbonate track etched membrane; or silicon nitride or a mixture thereof. The pores of the porous substrate are 5 nm-200 µm, particularly 10 nm-100 µm, even more particularly 20 nm-10 µm. The porosity of the porous substrate is 1%-99%, particularly 1%-70%, even more particularly 1%-50%. In a particular embodiment of the invention, the porosity of the porous substrate is 10%.

The metallic layer is deposited in such a way on the surface of the support material that the surface of the support material is partially wetted by the metallic layer, forming non-wetted spaces between metallic layer accumulations realizing the plurality of feedthroughs. The feedthroughs forming the pores in the metallic layer are of a pore size of 1 nm to 1000 nm, in particular 1 nm to 100 nm.

The material of the metallic layer is deposited onto the support material by any coating method that yields a percolated metallic layer on the support material. In particular, the metallic layer is deposited onto the support material by means of electron beam evaporation, sputtering, or atomic layer deposition.

Part of the invention is further a pore comprising membrane manufactured by means of the method for a fabrication of a pore comprising membrane, wherein the pore size of the metallic layer is 1 nm to 1000 nm, in particular 1 nm to 100 nm, and the pore size of the porous substrate is 5 nm-200 µm, particularly 10 nm to 100 µm, particularly 20 nm to 10 µm. Pore size means the minimum extension of the hole or space defined by the pore, measured perpendicular to the longitudinal extension of the respective pore. That is, in pores having a circumferential cross section, the range is measured as the diameter of the cross section.

The porosity of the metallic layer is of 1-50%, particularly 10-40%, particularly 15-25%, even more particularly 20%.

In filtration, these membranes could be used for ultra-, microfiltration and nanofiltration. As they are made of thin metallic films, these membranes are flexible, yet stable and resistant to harsh chemical environments (solvents, acids, bases). Furthermore, the cleaning of these membranes can be very easy so that a long lifetime can be achieved.

Further, the freestanding porous metallic layer allows new applications in energy harvesting/transformation (plasmonics), high sensitivity or/and specificity sensing (Surface Enhanced Raman Spectroscopy (SERS)). Combination of filtration and sensing allows in-situ filtration analysis.

These large surface, thin film membranes can be used as charge collectors in electrochemical setups as well as in fuel cells/batteries.

Further, these membranes may be applied as functionalized sensors. Metallic structures can be functionalized by anchoring molecules on the metal. Anchoring tailored molecules on the metal allows chemical sensing.

These membranes could also be applied as solute-solvent field effect transistors (FET): Allowing the control and study of charged and non-charged solute transport through the metal membrane by applying an external electrical bias to the metal membrane and controlling the transport passage.

SHORT DESCRIPTION OF THE FIGURES

FIG. 1: A cross-sectional view of a) a support material 2 and a metallic layer 3 on the support material 2; b) a protection material 5 on the metallic layer 3; c) the separated support material 2 and protection material 5 on the metallic layer 3 after removal of parts of the support material 2 and d) the pore comprising membrane 1 comprising the metallic layer 3 with pores 4 placed on the porous substrate 6 with pores 7.

Figure 2:
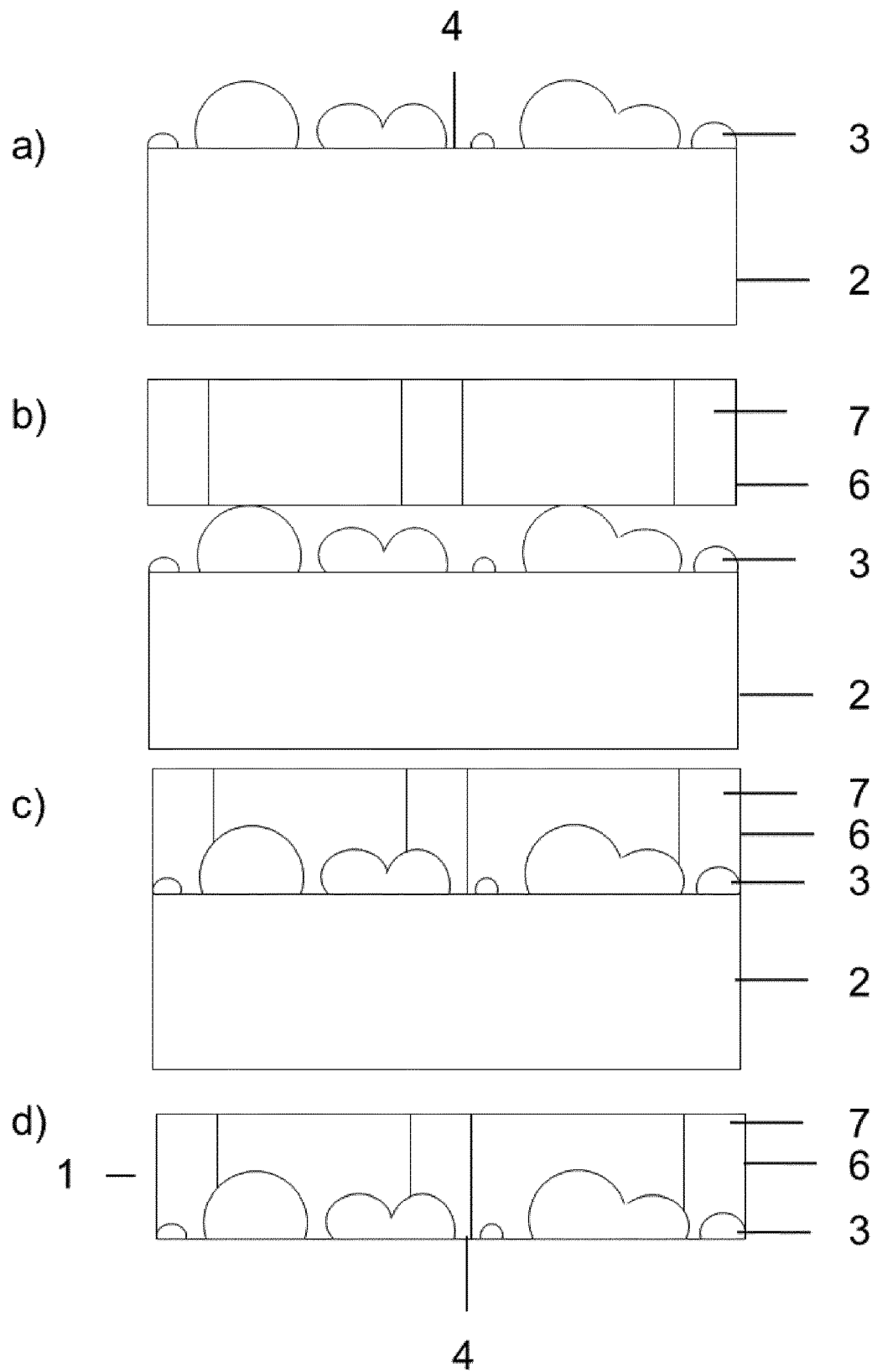

FIG. 2: A cross-sectional view of a) a support material 2 and a metallic layer 3 on the support material 2; b) and c) deposition of the porous substrate 6 with pores 7 onto the metallic layer 3 and d) the pore comprising membrane 1 comprising the pore comprising metallic layer 3 with pores 4 placed on the porous substrate 6 with pores 7 after removal of the support material 2.

Figure 3:
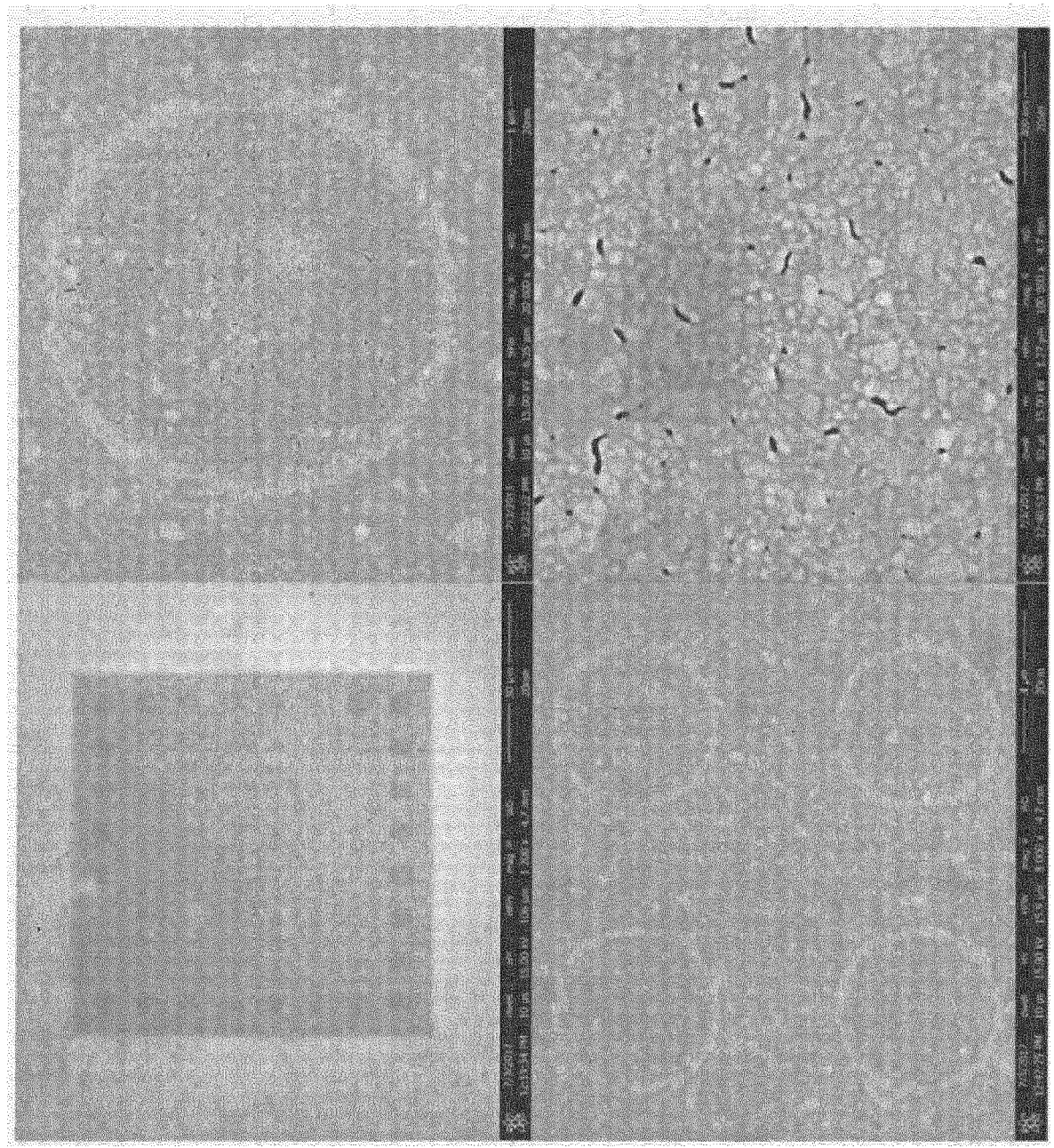

FIG. 3 shows a top side view SEM graph of a freestanding gold layer on a SiNx support.

Figure 4:
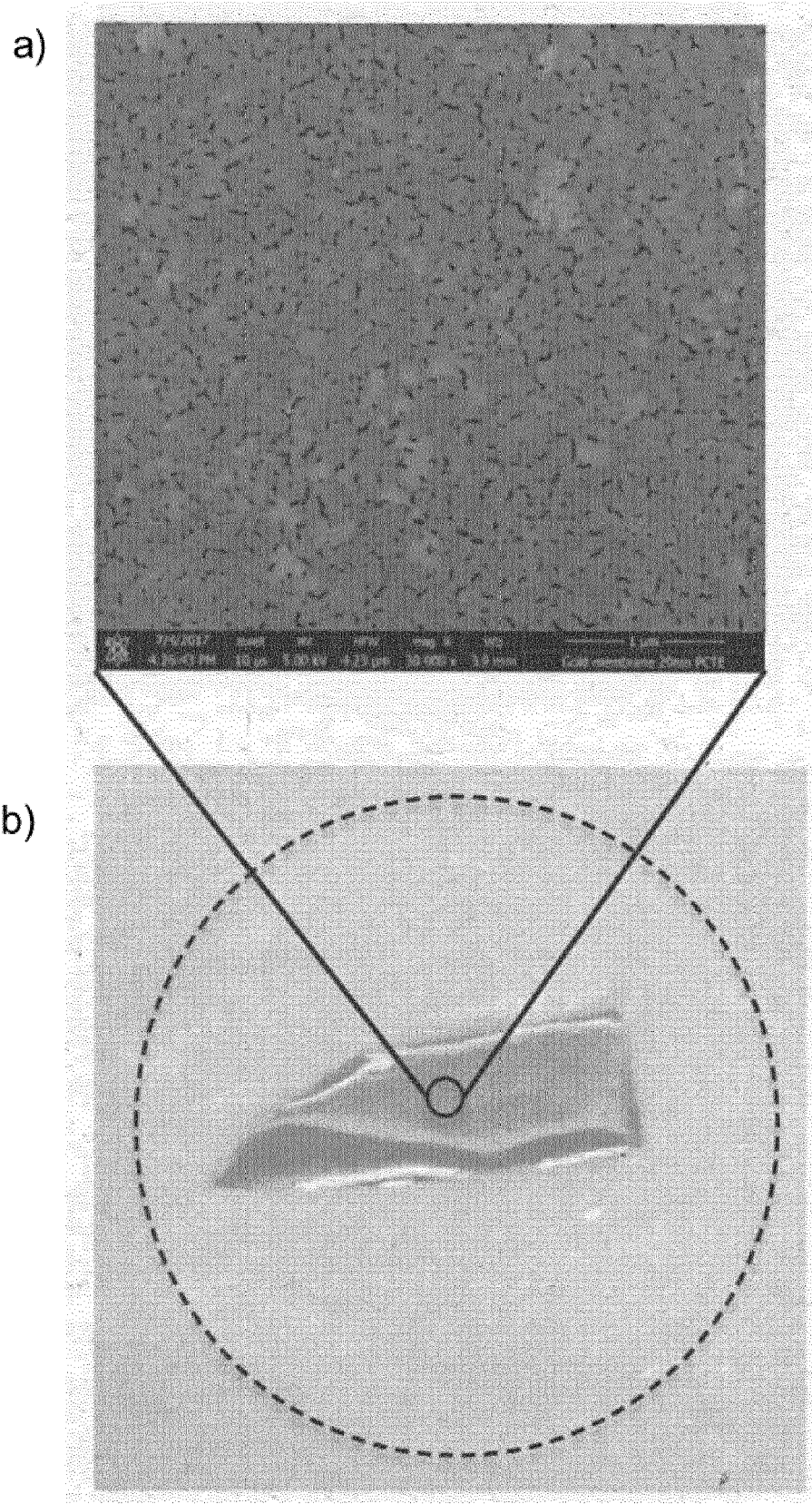

FIG. 4: a) a SEM graph of porous gold layer on a support; b) Photographic image of the gold layer on a support In FIG. 1, a method for a fabrication of a pore comprising membrane 1 is illustrated, in which in step a) a metallic layer 3 is provided on a support material 2. The support material 2 may consist of one or more layers. In a particular embodiment, the support material 2 comprises a layer of silicon dioxide and a subjacent layer of silicon 1. The metallic layer 3 may be gold. A percolation network of the metallic layer 3 is provided on the support material 2. In particular, a percolation network of gold is provided on a layer of silicon dioxide.

In step b), the protection material 5 is placed onto the metallic layer 3. The protection material can be poly(methyl methacrylate), which can be spin coated onto the metallic layer 3. In step c), the support material 2 is removed from the metallic layer. In a particulate embodiment, the silicon dioxide layer of the protection material is removed by etching silicon dioxide in hydrofluoric acid, resulting in the metallic layer 3 being placed on the protection material 5.

The protection material 5 and the metallic layer 3 are then placed onto the porous substrate 6 with pores 7 and the protection material 5 is removed, yielding the pore comprising membrane 1 as shown in d). In a particular embodiment, the porous substrate comprises $SiN_x$.

In FIG. 2, a method for a fabrication of a pore comprising membrane 1 is illustrated, in which in step a) a metallic layer 3, in particular a gold layer, is provided on a support material 2. The support material may consist of one or more layers. In a particular embodiment, the support material comprises a layer of silicon dioxide and a subjacent layer of silicon. A percolation network of gold 3 is provided on the silicon dioxide layer of the support material 2.

In step b), the porous substrate 6 is placed onto the metallic layer 3, yielding a material c) that comprises at least three layers: support material 2 metallic layer 3 and porous substrate 6 In a particular embodiment, the porous substrate 6 is a polycarbonate track-etched membrane.

After removal of the support material 2 the metallic layer 3 with pores 4 placed on the porous substrate 6 with pores 7 is obtained, as shown in d).

In FIG. 3, a freestanding gold layer is shown on a SiNx support. The nominal thickness of the gold layer is 20 nm. The pores in the metal are visible as black dots in the upper right image having highest magnification. The scale bars are: Upper left: 1 μm, upper right: 300 nm, lower left: 30 μm, lower right: 4 μm.

FIG. 4 a shows a gold layer on a polycarbonate track etched membrane (PCTE) support. The pores in the gold are represented by black spots. The scale bar is 1 μm.

FIG. 4b is a photographic representation of the material of FIG. 4a, a porous gold layer on a PCTE support. The dashed circle outlines the PCTE membrane, the gold layer is visible as grey film on the PCTE support.

EXAMPLES

Example 1

The manufacturing of the membrane is carried out in a 2-step process: (1) deposition of the substance onto a target material and (2) lift-off and transfer of the membrane.

(1) The support material is metal oxide, e.g., silicon dioxide, self-sustaining or sustained by a mechanical support, e.g. a silicon wafer. The oxide layer thickness is as thin as 10 nm, whereas there is no upper bound. Metal, e.g., gold, is deposited on the oxide layer via electron-beam evaporation. The metal deposition thickness between 5 and 50 nm results in a porous yet percolated film of the metal on the dioxide surface, owing primarily to disparate surface energies of the two materials that effectively dewet the metal film from the oxide. Following, the porous metal film can be transferred to a destination substrate. The pore size/porosity of the metal membrane can be tailored by the metal film thickness; the thicker the metal film, the smaller the pore size and the lower the porosity.

(2) Dual options for the film transfer method:

(i) The spin coating of a poly(methyl methacrylate) (PMMA) film (at least 50 nm in thickness) on the metal membrane creates a stable enough protection layer for subsequent lift-off. The lift-off of the PMMA/metal is performed in buffered hydrofluoric acid (BHF), by "floating-etch", where the sample is not immersed in the solution but rather floats on the surface of the BHF so that the oxide is etched away and the PMMA/metal is released from the silicon support. The PMMA/metal is transferred to a water bath to rinse away the remaining BHF. The PMMA/metal is then transferred to the porous target substrate by fishing the floating PMMA/metal film and let dry. The PMMA is removed afterwards by oxygen plasma etching.

(ii) The second transfer method can be employed if the target substrate is a porous polymer film such as polycarbonate track-etched (PCTE) membrane. A PCTE membrane is placed on the metal-on-oxide layers and subsequently baked on a hotplate above glass transition temperature of the polymer for a short duration (<2 min). The PCTE and metal will adhere to each other after this step. Then, the PCTE/metal can be released from the support by either BHF floating etch as in (i) or by peeling the PCTE/metal from the support.

REFERENCE SIGNS

1 Pore comprising membrane
2 Support material
3 Metallic layer
4 Pore in metallic layer
5 Protection material
6 Porous substrate
7 Pore in porous substrate

The invention claimed is:

1. Method for a fabrication of a pore comprising membrane (1),
comprising at least a porous metallic layer (3) on a porous substrate (6), wherein
the porous metallic layer (3) is connected to the porous substrate (6) and
the pores (4) of the metallic layer (3) overlap at least partially with the pores (7) of the porous substrate (6),
wherein the method comprises at least the following steps:
i) deposition of the metallic layer (3) onto a support material (2),
wherein the deposited metallic layer (3) forms a plurality of feedthroughs,
ii) removal of the support material (2),
iii) connecting of the metallic layer (3) with the porous substrate (6) such that pores (4) of the metallic layer (3) overlap at least partially with the pores (7) of the porous substrate (6).

2. Method for a fabrication of a pore comprising membrane (1) as claimed in claim 1, wherein the method further comprises the steps of:
   i) prior to removal of the support material (2), covering the metallic layer (3) with a protection material (5), in that a multilayer composition forms with the metallic layer (3) confined between the support material (2) and the protection material (5),
   ii) removal of the support material (2), resulting in the metallic layer (3) being deposited on the protection material (5),
   iii) removal of the protection material (5).

3. Method for a fabrication of a pore comprising membrane (1) as claimed in claim 1, wherein the method further comprises the step of:
   prior to removal of the support material (2), covering the metallic layer (3) by the porous substrate (6), resulting in a composite of these layers.

4. Method for a fabrication of a pore comprising membrane (1) according to claim 2, further comprising
   deposition of the metallic layer (3) on the porous substrate (6), comprising at least the steps of
   i) covering the metallic layer (3) deposited on the protection material (5) with the porous substrate (6), in that a multilayer composition forms with the metallic layer (3) confined between the protection material (5) and the porous substrate (6),
   ii) removal of the protection material (5) yielding the metallic layer (3) deposited on the porous substrate (6).

5. Method for a fabrication of a pore comprising membrane (1) according to claim 2, characterized in that during the removal of the support material (2) conditions are applied such that the metallic layer (3) as well as the protection material (5) are at least temporally inert.

6. Method for a fabrication of a pore comprising membrane (1) according to claim 3, characterized in that during the removal of the support material (2) conditions are applied such that the metallic layer (3) as well as the porous substrate (6) are at least temporally inert.

7. Method for a fabrication of a pore comprising membrane according to claim 4, characterized in that during the removal of the protection material (5) conditions are applied such that the metallic layer (3) as well as the porous substrate (6) are at least temporally inert.

8. Method for a fabrication of a pore comprising membrane according to claim 1, wherein the metallic material of the metallic layer (3) is gold, platinum, silver, tungsten, copper, tantalum, molybdenum, palladium, iron, titanium, rhodium or osmium and any alloy thereof.

9. Method for a fabrication of a pore comprising membrane (1) according to claim 1, wherein the support material (2) has a surface energy that differs from the surface energy of the metallic layer, such that a dewetting between the support material (2) and the material of the metallic layer (3) occurs.

10. Method for a fabrication of a pore comprising membrane (1) according to claim 2, wherein the protection material (5) is a polymer or a photoresist.

11. Method for a fabrication of a pore comprising membrane (1) according to claim 1, wherein the material of the porous substrate (6) is ceramic, polymer, oxide or metal or a mixture thereof.

12. Method for a fabrication of a pore comprising membrane (1) according to claim 1, wherein the metallic layer (3) is deposited in such a way on the surface of the support material (2) that the surface of the support material (2) is partially wetted by the metallic layer (3), forming non-wetted spaces between metallic layer (3) accumulations realizing the plurality of feedthroughs.

13. Method for a fabrication of a pore comprising membrane (1) according to claim 1, wherein the material of the metallic layer (3) is deposited onto the support material (2) by means of electron beam evaporation, sputtering, or atomic layer deposition.

14. A pore comprising membrane (1) manufactured by means of the method for a fabrication of a pore comprising membrane (1) as claimed in claim 1, wherein the pore size of the metallic layer (3) is 1 nm to 1000 nm, and the pore size of the porous substrate (6) is 5 nm to 200 μm.

* * * * *